United States Patent Office 3,333,033
Patented July 25, 1967

3,333,033
PROCESS FOR PRODUCING BODIES OF
REFRACTORY MATERIAL
Paul Metz, Dudelange, Luxembourg, assignor to ARBED,
Acieries Reunies de Burbach-Eich-Dudelange, Luxembourg, a corporation of Luxembourg
No Drawing. Filed Oct. 23, 1965, Ser. No. 504,225
8 Claims. (Cl. 264—27)

This application is a continuation-in-part of my copending application Ser. No. 123,884, filed July 13, 1961, and now abandoned.

The present invention relates to a process for producing bodies of refractory material from a comminuted ceramic mass whose particles are brought to at least partial coalescence, i.e., are sintered or fused, by high-temperature heating in the presence of a carbonaceous binder.

As also pointed out in my copending U.S. patent application Ser. No. 123,619, filed July 13, 1961 (now abandoned), entitled, "Refractory Composition and Process for Making Same," the refractoriness of a body so manufactured depends to a large extent upon the proportion of elemental carbon present in the material, i.e., between the predominating noncarbonaceous grains thereof and also within the interior of the grains. It is, therefore, the general object of the present invention to provide a simple process for producing such bodies with a more effective carbon content for the purpose set forth.

I have found, in accordance with the present invention, that this object can be realized by permeating the particles of the ceramic starting material, namely alumina and magnesia particles, with one or more thermally unstable carbon compounds leaving a residue of elemental carbon upon heating, especially bituminous hydrocarbons, and heating the mixture under an ambient pressure exceeding normal atmospheric pressure by about 5 kg./cm.$^2$ or more, i.e., a pressure upwards of about 5 atmospheres. This coking step, which preferably is carried out in a non-oxidizing (i.e., inert or reducing) environment, proceeds generally at temperatures substantially lower than those conventionally used in the sintering of refractory particles. Thus, the coking operation referred to may be performed at approximately 300° to 600° C., and may be repeated one or more times with intervening cooling and reimpregnation if a further increase in carbon content is required; in certain instances, e.g., when it is desired to fire the resulting article by an electric current passed directly through its mass as described and claimed in my copending U.S. application Ser. No. 123,885, entitled, "Process for Making Refractory Articles" (now U.S. Patent No. 3,250,832 issued May 10, 1966), the treatment temperature may be carried to a level on the order of 800° C. in order to impart the necessary conductivity to the treated material.

The coking of an organic binder in a ceramic mass previously subjected to preliminary sintering, prior to a final sintering operation at high temperatures, has been disclosed in my erstwhile application Ser. No. 23,371 filed April 20, 1960 (now U.S. Patent No. 3,111,415 issued November 9, 1963).

The hydrocarbons employed are advantageously bituminous substances obtained from coal-tar or petroleum distillation, e.g., fractions boiling between about 150° or preferably 250° to 400° C. at atmospheric pressure. They may, in particular, have been subjected prior to impregnation to a preliminary heat treatment at a temperature between substantially 150° and 500° C. under an absolute pressure upward of two atmospheres as disclosed and claimed in my U.S. application Ser. No. 123,612, entitled, "Organic Binder and Process for Making Same," originally copending with parent application Ser. No. 123,884 and since abandoned. Other, especially heavier bituminous or synthetic carbon compounds, which are thermally instable so as to leave a carbon residue upon heating, may also be used with or without conventional condensing or polymerizing catalysts for promoting the liberation of carbon, e.g., ethylene or other fluids capable of forming free radicals.

The heat treatment of the hydrocarbon-impregnated ceramic material under pressure, by the process of the present invention, enhances both the quantity and the quality of the carbon content of the treated material as compared with processes in which no pressure is used. A marked increase in the ability of the finished product to withstand physical, chemical and thermal attacks is realized with gauge pressures upwards of the order of atmospheres, whereas even better results are observed with pressures as high as thirty to forty atmospheres. These favorable properties of ceramics treated by the present process, well proved by actual tests, appear to be due to the fact that the heating under pressure enhances the quantity and quality of the inner grains and especially those within the finer ceramic particles which act as fillers for the larger particles; the elemental carbon lodged within the grains, and especially that present inside the finer particles acting as fillers for the coarser constituents, has been found to play a role fully as important as the one played by the carbon existing between the grains. The bituminous materials at these temperatures and pressures crack to form heat-resistant graphitic residues among other carbon particles which cushion the ceramic particles at their interstices while filling the interstice pores with elemental carbon.

Various minerals in particulate form can be used as the ceramic starting material. This includes specifically the ceramics containing major proportions of aluminum oxide magnesium oxide and/or carbonate, such as native or sea-water magnesites or dolomites, yet other refractory materials (such as aluminum silicates) may also be employed. The starting material may have the form of granules or lumps having a diameter up to about 30 mm.; it is desirable that they have a porosity of less than 10 to about 60% in terms of void/solid volumetric ratio. In general, the invention is applicable to both pre-shaped bodies and blanks from which such bodies are to be subsequently formed either directly or with intervening recomminution and resintering. The admixed hydrocarbon may, if desired, be supplemented by elemental carbon in finely divided form, e.g., by graphite.

I have determined that the properties of the bodies produced by the present process, in particular their resistance to thermal stresses, are further improved if the material to be impregnated has not been subjected to intensive heating prior to the coking step, i.e., if its particles have been sintered together only lightly or not at all. Thus, if the invention is to be applied to bodies already preshaped to final form, it is desirable to utilize means other than presintering, such as mechanical clamping and/or chemical bonding, to hold the particles temporarily together in a highly porous skeleton having the desired configuration. The hydrocarbons themselves may serve as bonding agents for this purpose. Preheating at moderate temperatures, however, is generally not objectionable and often desirable. If, for example, the material is originally rich in unwanted oxides, such as iron oxides, it may be heated in a reducing atmosphere (e.g., hydrogen) in order to reduce at least a portion of such oxides; also, preheating may be employed to effect a preliminary decarbonization, e.g., at temperatures up to 1300° C. as described in my U.S. application Ser. No. 123,619, entitled, "Refractory Composition and Process for Making Same."

The process according to the present invention results in refractory bodies which in many cases will be subject to further curing at high temperatures, either by a specal after-treatment or by their intended use in a heated environment; the latter will be the case, for example, with bricks used to make linings for metallurgical furnaces or with larger integral articles such as blocks and converter bottoms. The special heating to high temperatures, besides causing the particles to coalesce partially or completely into a sintered or fused mass, also affords higher resistance against oxidic-slag formation; this step may be followed, as more fully set forth in my last-mentioned patent application, by a recomminution of the coherent mass into particles of highly refractory character which can then be formed into the final article by conventional admixture with an organic binder and subsequent resintering. In many instances the highly carbon-enriched and comminuted composition so obtained will be used not alone but in combination with another fraction of ceramic particles produced in conventional manner, the latter fraction preferably consisting of relatively coarse grains for which the particles produced with the aid of the present process constitute a finely divided filler of particle sizes up to, say, 2 or 3 mm.; it is, however, equally feasible to produce the coarser fraction in the manner herein disclosed.

It should be understood that the aforedescribed recomminution of the material treated in accordance with the process of this invention can also be carried out without the second heating step. In those instances where such high-temperature heat treatment is employed, this step may be carried out at the same pressure as the coking step; in practice, however, it will usually be simpler to perform the final heating under less elevated or even atmospheric pressure.

The pressure exerted during the coking step upon the material under treatment may be provided by the surrounding non-oxidizing fluid and/or by the vapors released from the decomposed hydrocarbon. Upon cooling, especially from relatively low coking temperatures, care should be taken to relieve this pressure in a very gradual manner so as to avoid cracking of the treated body by the sudden evaporation of any residual hydrocarbon.

In order to facilitate absorption of the cokable additive, the material to be impregnated may be subjected to a vacuum treatment immediately prior thereto; penetration is also enhanced by a heating of the impregnant and/or of the ceramic base.

The following examples are ilustrative of the manner in which the invention may be carried into practice.

*Example I*

Bricks of magnesite and/or dolomite, conventionally sintered from a compressed mixture of granules of this material with tar or pitch, are impregnated after a vacuum treatment and heating to 150° C. by a mixture of bituminous hydrocarbons boiling between 250° and 400° C. They are then heated in a nitrogen atmosphere to 600° C. under an ambient pressure of 15 kg./cm.² (about 15 atmospheres gauge); this operation may be repeated one or more times with intervening cooling to 150° C. and reimpregnation. After the last coking step at 600° C. and cooling they are impregnated once more without further heating; they are thereupon ready for use in a furnace lining or the like.

*Example II*

Bricks molded from a mixture of ceramic granules of the aforedescribed type pitch or tar are heated to 300° C. under a pressure of 20 atmospheres. They are then ready for use as in the preceding example, subject to final curing in their ultimate environment; better results are obtained, however, if they are subjected to one or more reimpregnations with tar or oil at similar pressure and with heating to a temperature between about 500° and 600° C.

*Example III*

Two fractions of particulate ceramic material are independently prepared. The first consists of relatively dense, coarse particles of dolomite, magnesite and/or magnesium chromite of 2 to 20 mm. diameter; the second fraction is of lower density and consists of particles of dolomite and/or magnesite of 2 to 30 mm. grain size, with a porosity of 20 to 30%. This relatively porous fraction is treated in accordance with the invention by impregnation with tar and subsequent heating to 500° C. under a pressure of 10 kg./cm.²; the treatment may be repeated one or more times. Thereafter this porous fraction is comminuted to a grain size of less than 2 mm. and blended, in a proportion of 45 parts by weight, with 55 parts of the denser fraction which may or may not have been treated in similar manner but has been steeped into hot tar or pitch prior to admixture. An additional quantity of pitch or tar is combined with the mixture in a suitable blender until the total quantity of heavy hydrocarbons present equals about 6 to 9% by weight. The final mixture is compacted by vibration and/or compression into bricks or blocks which can be used as in the preceding example; their quality may be further improved by a heating to 400° C. under a pressure of 30 kg./cm.². The resultant products are highly resistive to thermal stresses.

*Example IV*

Highly slag-resistant refractory bodies are produced from lumps up to 40 mm. in grain size consisting of minerals rich in magnesium oxide and/or carbonate, such as native or sea-water magnesites or dolomites, by heating this starting material to a temperature of not more than about 1300° C. so as to produce a decarbonized mass which may be lightly sintered and should have a porosity of at least 25%. This mass is impregnated with one or more hydrocarbon additives, as in the preceding examples, and heated under a pressure of 30 atmospheres to 800° C. and under non-oxidizing conditions so as to acquire an electrical conductivity sufficient for the passage of a heating current as described and claimed in my above-identified application entitled, "Process for Making Refractory Articles." The product is then heated, at least partly with the aid of such internal current, to a temperature of the order of 2000° C. whereby a very firm coalescence of its particles is achieved and the elemental carbon present therein is graphitized. During or immediately after sintering, preferably while still at or near its highest temperature, the product may be compacted by pressure and/or vibration to increase its density; the electrical resistance of the carbon/ceramic mixture may be further lowered, if desired, by the inclusion of pieces of graphite or silicon carbide therein preparatorily to connecting it in the heating circuit.

The sintered mass so obtained may then be comminuted to a suitable particle size or range of such sizes for subsequent shaping into the finished article; in particular, it may be ground to a particle size below 0.5 or 2 mm. and blended with a coarse fraction, consisting of large grains of dolomite, magnesite and/or magnesium chromite, as well as tar or pitch to form a plastic mass which may be shaped by tamping or compression into an article of desired configuration prior to final curing.

*Example V*

A mixture of tar with natural dolomite and/or magnesite particles, or preferably a mixture as produced by the final step of Example III or IV, is shaped by tamping or vibration into a cylindrical converter bottom with a diameter of 280 cm. and a height of 110 cm. This body is traversed by 500 copper tubes distributed throughout its mass. It is then introduced into an oven chamber capable of resisting a pressure of 30 kg./cm.² (about 30 atmospheres gauge) which is developed therein, after evacuation of the air therefrom, by the admission of nitrogen or furnace gas into its interior. The hydrocarbon-impregnated ceramic body is then heated as uniformly as possible to a temperature between 350° and 550° C., this being readily achieved by passing a heating fluid through its tubes or by disposing electrical heating elements therein—though other methods, such as dielectric heating, are also feasible. The partial volatilization of the impregnant helps maintain the pressure in the oven chamber, any excess gas escaping through a suitable safety valve. When the entire mass has attained the desired temperature, heating is discontinued and the treated body is subjected to forced or spontaneous cooling while the pressure in the chamber is maintained until the temperature has dropped to 150° C. and is then reduced to atmospheric level at a rate less than 1 kg./cm.² per minute. The converter bottom is now ready for use and will have a service life exceeding by at least 50% that of a bottom produced by conventional methods.

*Example VI*

A refractory body highly resistant to thermal stresses is produced by temporarily cementing a particulate ceramic material, of the character previously set forth, at room temperature into a porous skeleton having the desired shape. This skeleton, upon the drying of the adhesive which may be of an organic or inorganic character, is impregnated with a hydrocarbon additive and fired at 600° C. in a non-oxidizing atmosphere under a pressure of 35 kg./cm.²; (about 35 atmospheres gauge) the resulting article, after cooling, is ready for use.

*Example VII*

Plugs for casting ladles, usually produced from aluminum silicates fired at temperatures greater than 1200° C., are heated to a temperature below that level so that their particles cohere but weakly in a manner just sufficient to maintain their shape during the subsequent processing which consists in a vacuum treatment followed by impregnation with tar, as hereinabove described, and firing at 600° C. under a pressure of 40 atmospheres in a non-oxidizing environment. The articles so produced, like those obtained in accordance with Example III, are highly resistive to thermal stresses.

I claim:
1. A process for producing a body of refractory material resistant to thermal stresses, comprising the steps of:
    shaping a mass entirely composed of inorganic particles, consisting in major part of at least one ceramic material selected from the group which consists of magnesia and alumina, into a porous body of the configuration to be produced;
    holding said particles together by preliminary sintering while maintaining the porosity of said body;
    impregnating said body with at least one bituminous hydrocarbon thermally decomposable at a temperature above about 300° C. into elemental carbon;
    heating the impregnated body in a closed chamber under an inert-gas pressure to a temperature less than substantially 1000° C. but sufficient to cause at least partial decomposition of said hydrocarbon to produce a residue of elemental carbon substantially filling said body between the interstices of said particles of ceramic material;
    and maintaining the gas pressure in said chamber at a level upwards of about 5 atmospheres throughout the heating step.

2. A process as defined in claim 1 wherein said pressure in said chamber is reduced to ambient atmospheric pressure at a rate less than about 1 kg. per cm.² per minute after the heating step.

3. A process as defined in claim 1 wherein the mass containing said elemental carbon is subsequently heated under a gas pressure greater than atmospheric to a substantially higher temperature than that at which said elemental carbon was formed to partially coalesce said inorganic particles.

4. A process as defined in claim 1 wherein the heating step is carried out by initially heating the impregnated mass to a temperature on the order of 800° C., the body containing elemental carbon thus formed in situ and thereby rendered electrically conductive being further heated by passage of an electric current through the body.

5. A process as defined in claim 1 wherein said hydrocarbon has a boiling point between substantially 250° and 400° C. at atmospheric pressure, said ceramic material consisting of at least one ceramic selected from the group which consits of magnesite, dolomite and aluminum silicate, said particles consisting of granules of the ceramic range in particle diameter between substantially up to 30 mm., said body having a porosity up to 60% prior to impregnation by said hydrocarbon.

6. A process as defined in claim 5 wherein the heating step is carried out in a nitrogen atmosphere to a temperature of at least 600° C., and the body is thereafter cooled to a temperature of at least 150° C., re-impregnated with said bituminous hydrocarbon, and reheated to a temperature of at least 600° C. for cokification of said bituminous carbon.

7. A process as defined in claim 1 wherein said mass is subjected to a heating in a reducing atmosphere prior to the impregnation and heating steps.

8. A process as defined in claim 1 wherein the inert-gas pressure in said chamber is produced by introduction of gas initially under pressure into the chamber.

References Cited

UNITED STATES PATENTS

| | | | |
|---|---|---|---|
| 421,469 | 3/1890 | Adeney | 264—105 |
| 1,390,823 | 9/1921 | Sieurin | 264—27 |
| 1,430,724 | 10/1922 | d'Adrian | 264—27 |
| 3,015,850 | 1/1962 | Rusoff | 264—29 |
| 3,124,625 | 3/1964 | Sheinberg | 264—29 X |
| 3,126,430 | 3/1964 | Price | 264—29 |

ROBERT F. WHITE, *Primary Examiner.*

R. B. MOFFITT, *Assistant Examiner.*